(12) United States Patent
Ishibashi

(10) Patent No.: US 7,775,037 B2
(45) Date of Patent: Aug. 17, 2010

(54) EXHAUST GAS TEMPERATURE CONTROL METHOD, EXHAUST GAS TEMPERATURE CONTROL APPARATUS, AND INTERNAL COMBUSTION ENGINE SYSTEM

(75) Inventor: Yasutaka Ishibashi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 428 days.

(21) Appl. No.: 11/862,603

(22) Filed: Sep. 27, 2007

(65) Prior Publication Data

US 2008/0078169 A1 Apr. 3, 2008

(30) Foreign Application Priority Data

Oct. 2, 2006 (JP) ............................ 2006-270574
Sep. 7, 2007 (JP) ............................ 2007-232837

(51) Int. Cl.
*F01N 3/00* (2006.01)
(52) U.S. Cl. ............................ 60/287; 60/277; 60/285; 60/299; 60/301; 60/295
(58) Field of Classification Search ........... 60/284–286, 60/277, 299–301, 295
See application file for complete search history.

(56) References Cited

U.S. PATENT DOCUMENTS 6,971,970 B2 * 12/2005 Inoue et al. ................... 477/97

2005/0039442 A1 * 2/2005 Ishibashi et al. .............. 60/285
2005/0056005 A1 * 3/2005 Otake et al. .................. 60/295

FOREIGN PATENT DOCUMENTS

JP 2005-042715 2/2005

* cited by examiner

*Primary Examiner*—Thomas E Denion
*Assistant Examiner*—Jesse Bogue
(74) *Attorney, Agent, or Firm*—Global IP Counsels, LLP

(57) ABSTRACT

The exhaust gas temperature control method includes executing an exhaust gas temperature control to raise an exhaust gas temperature upon determining that a purificatory performance of an exhaust gas purification device of an engine has declined. The step of executing of the exhaust gas temperature control includes performing a first fuel injection control in which a timing of a main fuel injection is retarded and a post fuel injection is executed after the main fuel injection when the internal combustion engine is operating in the first operating region, and performing a second fuel injection control in which the timing of the main fuel injection is retarded and an execution of the post fuel injection after the main fuel injection is prohibited when the internal combustion engine is operating in the second operating region.

13 Claims, 7 Drawing Sheets

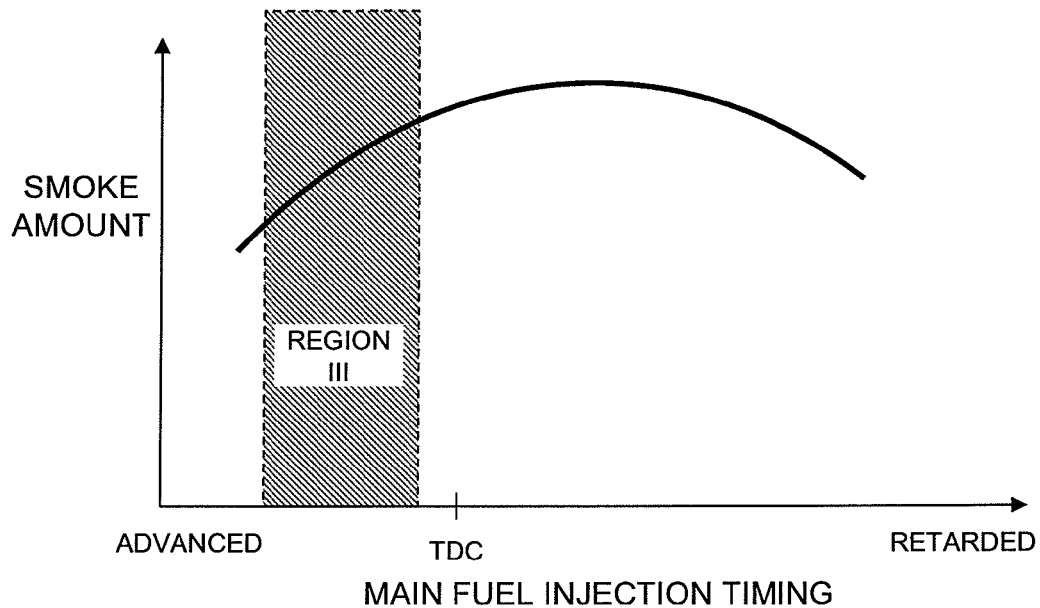
F I G. 3A
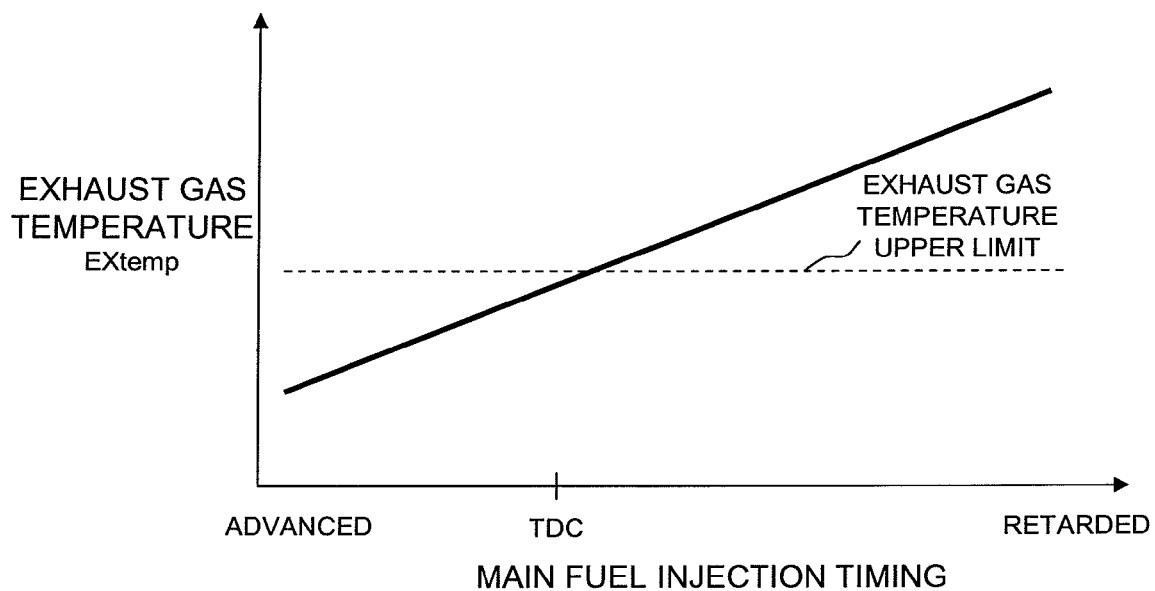
F I G. 3B

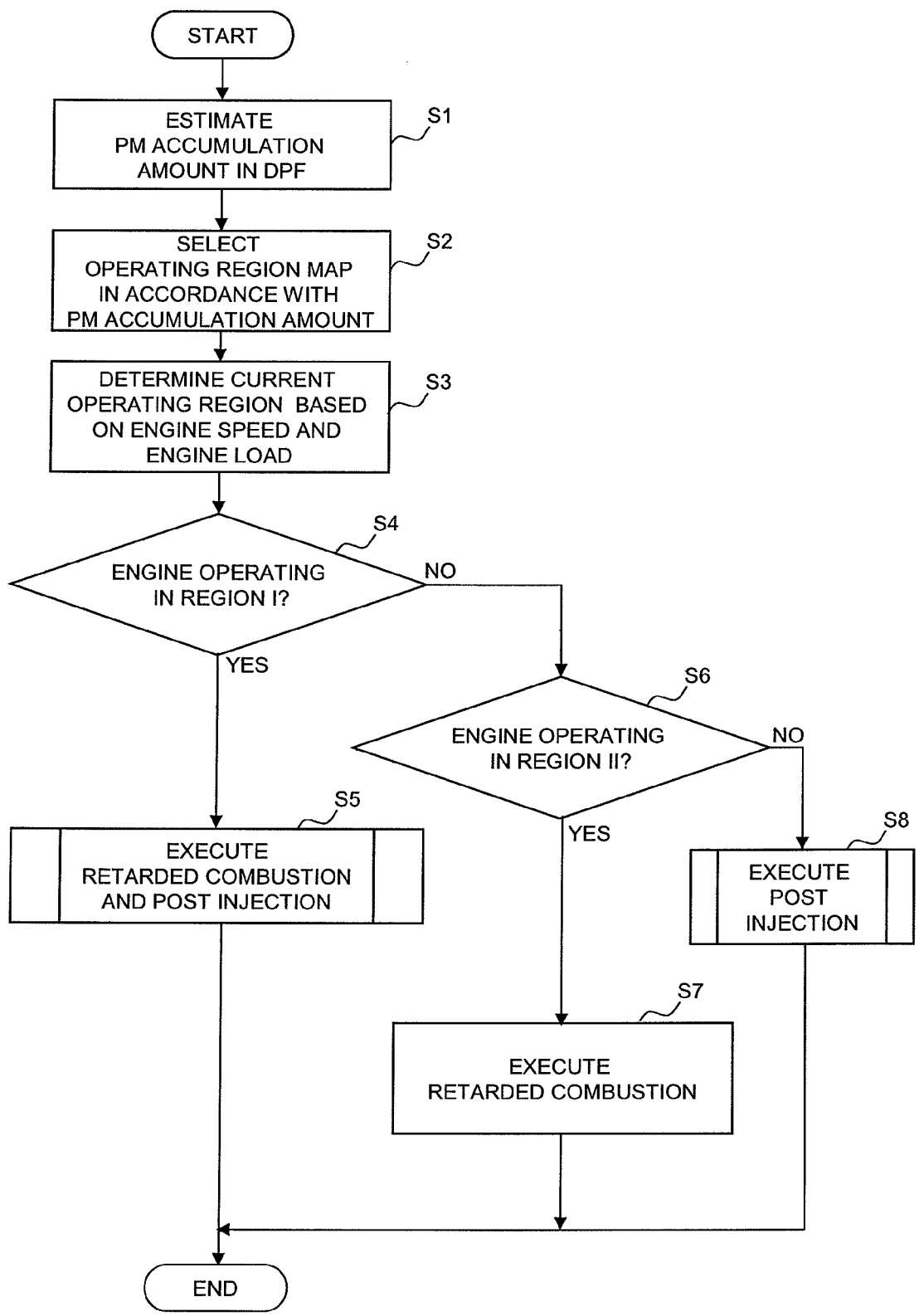
F I G. 4

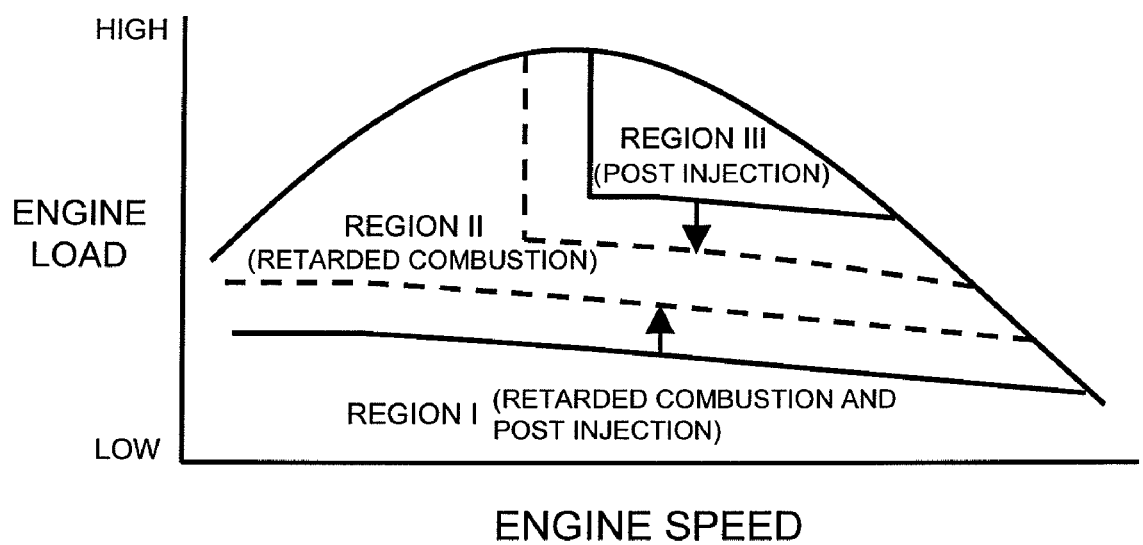
F I G. 5

EXHAUST GAS TEMPERATURE CONTROL METHOD, EXHAUST GAS TEMPERATURE CONTROL APPARATUS, AND INTERNAL COMBUSTION ENGINE SYSTEM

CROSS-REFERENCE TO RELATED APPLICATIONS

This application claims priority to Japanese Patent Application No. 2006-270574 filed on Oct. 2, 2006 and Japanese Patent Application No. 2007-232837 filed on Sep. 7, 2007. The entire disclosure of Japanese Patent Application No. 2006-270574 and No. 2007-232837 are hereby incorporated herein by reference.

BACKGROUND OF THE INVENTION

1. Field of the Invention

The present invention relates to an exhaust gas temperature control method, an exhaust gas temperature control apparatus, and an internal combustion engine system for controlling the temperature of exhaust gas discharged from an internal combustion engine.

2. Background Information

There are various known technologies for purifying an exhaust gas discharged from an engine using an exhaust gas purification device installed in an exhaust passage. For example, there are diesel particulate filters (DPF) that capture particulate matter (PM) discharged from diesel engines, and NOx trapping catalytic converters that trap nitrogen oxides (NOx) contained in the exhaust gas when the air fuel ratio of the exhaust gas is lean and clean and release the nitrogen oxides when the air fuel ratio of the exhaust gas is rich. When a diesel particulate filter continuously captures particulate matter, it eventually becomes clogged. Also, a NOx trapping catalytic converter becomes contaminated with sulfur over time due to the sulfur components exhausted from the engine. Therefore, the diesel particulate filter is regenerated by raising the temperature of the exhaust gas such that the accumulated particulate matter is combusted and removed. Similarly, the NOx trapping catalytic converter is regenerated by raising the temperature of the exhaust gas such that the sulfur contamination is removed.

For example, Japanese Laid-Open Patent Application Publication No. 2005-42715 proposes a method for raising the exhaust gas temperature by retarding (delaying) the timing of a fuel injection for a main combustion.

In view of the above, it will be apparent to those skilled in the art from this disclosure that there exists a need for an improved exhaust gas temperature control method, exhaust gas temperature control apparatus and internal combustion engine system. This invention addresses this need in the art as well as other needs, which will become apparent to those skilled in the art from this disclosure.

SUMMARY OF THE INVENTION

It has been discovered that when the fuel injection timing for the main combustion is retarded in order to raise the exhaust gas temperature, the engine lubrication oil becomes diluted (i.e., the fuel gets mixed in with the engine lubrication oil) under certain engine operating conditions.

The present invention was conceived in view of the aforementioned problem of the engine oil becoming diluted. One object of the present invention is to provide an exhaust gas temperature control apparatus or method that is configured and arranged to raise the temperature of the exhaust gas and to restore the performance of an exhaust gas purification device (e.g., regenerating a diesel particulate filter or removing sulfur contamination from a NOx trapping catalytic converter) while suppressing dilution of the engine oil.

In order to achieve the above object of the present invention, a method of controlling an exhaust gas temperature of an internal combustion engine having an exhaust gas purification device for purifying an exhaust gas is performed. The method includes the following steps: determining whether a purificatory performance of the exhaust gas purification device has declined; determining whether the internal combustion engine is operating in one of a first operating region and a second operating region that has higher engine loads than the first operating region; and executing an exhaust gas temperature control to raise an exhaust gas temperature upon determining that the purificatory performance of the exhaust gas purification device has declined, the executing of the exhaust gas temperature control including performing a first fuel injection control in which a timing of a main fuel injection is retarded and a post fuel injection is executed after the main fuel injection when the internal combustion engine is operating in the first operating region, and performing a second fuel injection control in which the timing of the main fuel injection is retarded and an execution of the post fuel injection after the main fuel injection is prohibited when the internal combustion engine is operating in the second operating region.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 3A is a schematic diagram for explaining how the smoke discharge amount varies with respect to the injection timing in the high engine speed/high engine load operating region in accordance with the illustrated embodiment of the present invention;

FIG. 3B is a schematic diagram for explaining the problem that occurs when the main fuel injection timing is retarded when the engine is operating in the region of high engine speeds and high engine loads;

FIG. 4 is a flowchart for explaining a main control flow executed by a controller of the exhaust gas temperature control apparatus in accordance with the illustrated embodiment of the present invention;

FIG. 5 is a schematic diagram for explaining how the operating region boundary changes depending on the particulate matter accumulation amount in accordance with the illustrated embodiment of the present invention;

DETAILED DESCRIPTION OF THE PREFERRED EMBODIMENTS

Selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
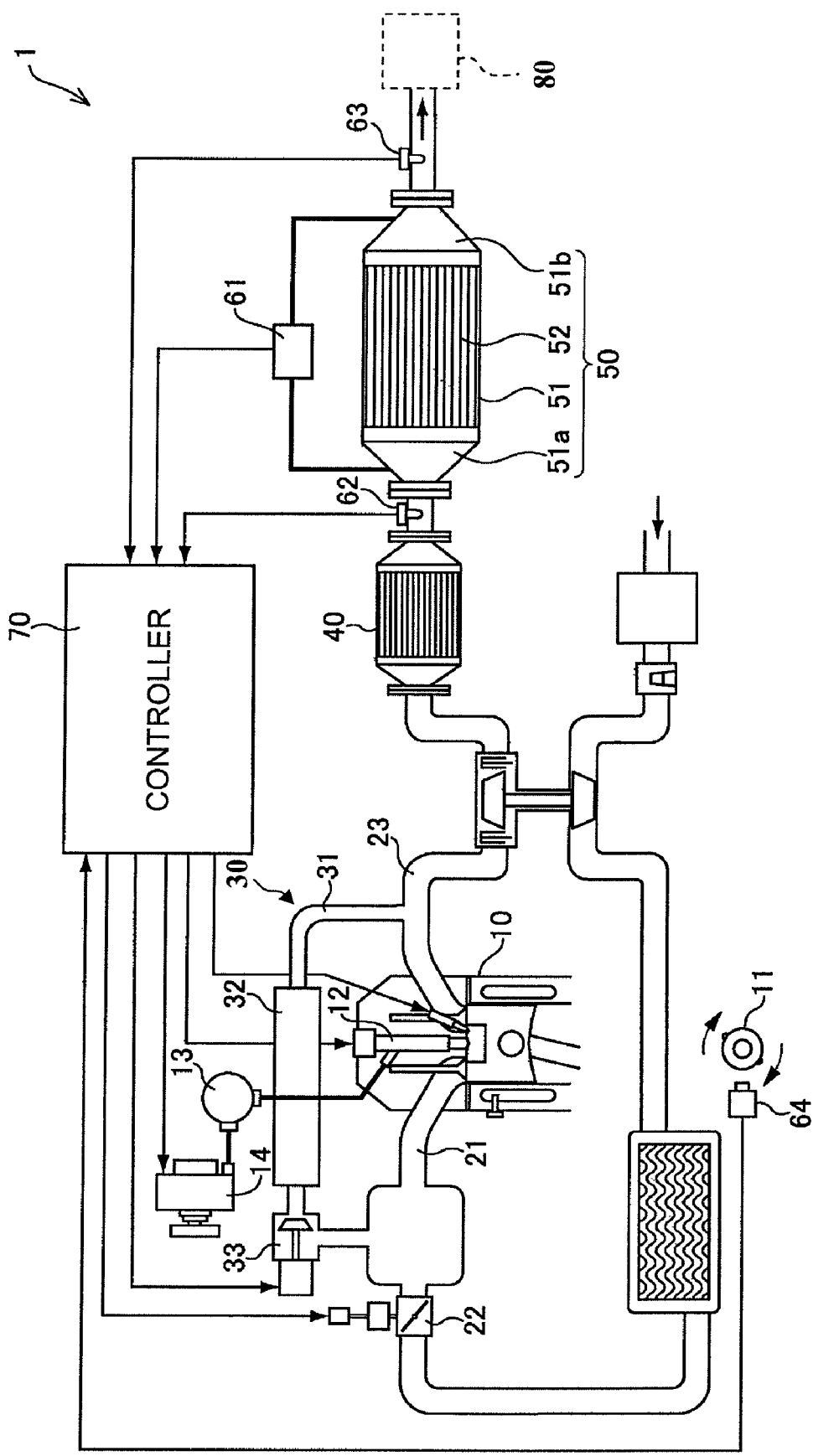
FIG. 1 is an overall system diagram of an internal combustion system having an exhaust gas temperature control apparatus in accordance with one embodiment of the present invention.

Referring initially to FIG. 1, an internal combustion system 1 including an exhaust gas temperature control apparatus is illustrated in accordance with one embodiment of the present invention. FIG. 1 is an overall system diagram showing the internal combustion engine system in accordance with the illustrated embodiment of the present invention.

As shown in FIG. 1, the internal combustion engine system 1 of the illustrated embodiment includes an internal combustion engine 10 (e.g., a diesel engine) having a plurality of combustion chambers each formed by a piston and a cylinder, a crankshaft 11 operatively coupled to the engine 10, a plurality of injectors 12 (only one injector 12 is shown in FIG. 1), a common rail 13, a high pressure pump 14, an intake manifold 21, an intake throttle valve 22, an exhaust passage 23, an exhaust gas recirculation (EGR) device 30, a diesel oxidative catalytic converter (hereinafter "DOC") 40, a diesel particulate filter (DPF) assembly 50, a pressure difference sensor 61, a DPF inlet temperature sensor 62, a DPF outlet temperature sensor 63 and a controller 70. The EGR device 30 includes an EGR passage 31, an EGR cooling device 32, and an EGR valve 33. The DPF assembly 50 includes a DPF housing 51 having an upstream chamber 51a and a downstream chamber 51b, and a DPF 52 housed inside of the DPF housing 51.

In the internal combustion engine system 1 shown in FIG. 1, the intake air that has been compressed with a compressor passes through an intercooler, the intake throttle valve 22 and the intake manifold 21 before being supplied to the cylinder of the engine 10. The intake air supplied to the cylinder of the engine 10 is compressed further by the compressing movement of the piston inside the engine 10. The common rail 13 is configured and arranged to temporarily store fuel that has been raised to a high pressure by the high pressure pump 14. The fuel is injected at a prescribed injection timing from the injector 12 to the cylinder of the engine 10. The intake air and the injected fuel form an air fuel mixture that is combusted to generate a desired engine torque according to an operating condition of the vehicle.

The exhaust gas produced by the combustion of the air fuel mixture is discharged from the engine 10 into the exhaust passage 23. A portion of the exhaust gas flowing through the exhaust passage 23 passes through the EGR device 30 and circulates back to the intake manifold 21. The EGR device 30 includes the EGR cooling device 32 and the EGR valve 33 that are arranged in the EGR passage 31. The EGR cooling device 32 is configured and arranged to cool the exhaust gas circulated from the exhaust passage 23. The opening degree of the EGR valve 33 is duty-cycle controlled by the controller 70. More specifically, the controller 70 is configured to adjust the opening degree of the EGR valve 33 based on the operating state of the engine 10 such that the EGR amount that is optimized to the current operating state is supplied to the engine 10.

On the other hand, the exhaust gas that continues flowing through the exhaust passage 23 is cleaned by the exhaust gas aftertreatment devices (e.g., the DOC 40 and the DPF 50) that remove or neutralize harmful substances contained in the exhaust gas. As shown in FIG. 1, the internal combustion engine system 1 can further include a well-known NOx trapping catalytic converter 80, as one of the aftertreatment devices, that is configured and arranged to remove sulfur contamination in the exhaust gas discharged from the engine 10.

In this illustrated embodiment, the DOC 40 is installed in a relatively upstream portion of the exhaust system as shown in FIG. 1. The DOC 40 is configured and arranged to reduce the amount of particulate matter (PM) discharged from the engine 10 using the oxidizing action of such a catalyst as palladium or platinum. The unburned fuel components (hydrocarbons (HC)) that flow into the DOC 40 react with the catalyst and raise the temperature of the exhaust gas flowing out of the DOC 40.

As shown in FIG. 1, the DPF assembly 50 is provided downstream of the DOC 40. The DPF 52 preferably has a porous honeycomb-shaped structure made of cordierite or other ceramic material with a plurality of lattice-shaped flow passages being formed by the porous thin walls of the DPF 52. The inlets of alternating flow passages are blocked while the outlets of the flow passages whose inlets are open (not blocked) are blocked. The exhaust gas flows into the DPF 52, and passes through the porous thin walls defining the individual flow passages. Then, the exhaust gas is discharged form the DPF 52 towards the downstream portion. The DPF assembly 50 including the DPF 52 is a conventional component that is well known in the art. Since the DPF assembly 50 is well known in the art, the structure thereof will not be discussed or illustrated in detail herein.

The particulate matter contained in the exhaust gas is captured by the inside surface of the porous walls of the DPF 52 and the particulate matter accumulates on the porous walls of the DPF 52. The accumulated particulate matter will burn inside the DPF 52 if the temperature of the DPF 52 (hereinafter the "bed temperature") is high. However, if the bed temperature is not high, then the amount of accumulated particulate matter that is burned will be small and the rate at which particulate matter is discharged from the engine 10 and accumulated in the DPF 52 will be faster than the rate at which the accumulated particulate matter is burned. If the DPF 52 continues to capture particulate matter under such conditions, then it will eventually become clogged. Therefore, the controller 70 is configured to execute an exhaust gas temperature control to raise the exhaust gas temperature when a certain amount of particulate matter has accumulated (i.e., when it is determined that the purificatory performance of the DPF 52 has declined) so that the accumulated particulate matter can be burned and removed from the DPF 52.

The pressure difference sensor 61 is configured to detect a pressure difference (pressure loss) between the upstream chamber 51a and the downstream chamber 51b of the DPF housing 51 (i.e., between the inlet and outlet of the DPF 52), and to send a pressure difference signal indicating the pressure difference to the controller 70.

The DPF inlet temperature sensor 62 is configured to detect an inlet temperature Tin of the DPF 52, and to send an inlet temperature signal indicating the inlet temperature Tin to the controller 70.

The DPF outlet temperature sensor 63 is configured to detect an outlet temperature Tout of the DPF 52, and to send an outlet temperature signal indicating the outlet temperature Tout to the controller 70.

The crank angle sensor 64 is configured to detect the rotational speed of the crankshaft 11 of the engine 10.

The controller 70 preferably includes a microcomputer with an exhaust gas temperature control program that controls the exhaust gas temperature of the engine 10 as discussed below. The controller 70 can also include other conventional components such as an input/output interface (I/O interface), and storage devices such as a ROM (Read Only Memory) device and a RAM (Random Access Memory) device. The microcomputer of the controller 70 is programmed to control, for example, the fuel injection timing and the fuel injection amount from the injector 12. The controller 70 is operatively coupled to the various components of the engine 10 in a conventional manner. The internal RAM of the controller 70 stores statuses of operational flags and various control data. The internal ROM of the controller 70 stores the various maps and data for various operations. The controller 70 is capable of selectively controlling any of the components of the control system in accordance with the control program. It will be apparent to those skilled in the art from this disclosure that the precise structure and algorithms for the controller 70 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The controller 70 is configured to receive the pressure difference signal from the pressure difference sensor 61, and to estimate a particulate matter accumulation amount Mpm of the DPF 52 based on the magnitude of the pressure difference. Then, the controller 70 is configured to determine whether it is time to regenerate the DPF 52 based on the particulate matter accumulation amount Mpm. The controller 70 is configured to receive the inlet temperature signal indicating the inlet temperature Tin from the DPF inlet temperature sensor 62 and the outlet temperature signal indicating the outlet temperature Tout from the DPF outlet temperature sensor 63, and to calculate the bed temperature of the DPF 52 based on the inlet temperature Tin and the outlet temperature Tout. The controller 70 is then configured to control the injectors 12 and the high pressure pump 14 based on the input signals to adjust the fuel injection amount and the injection timing. The controller 70 is also configured to adjust the opening degree of the throttle valve 22 based on the input signals. The controller 70 is also configured to control the EGR valve 33 by controlling the duty cycle thereof. By controlling fuel injection amount, the injection timing, the opening degree of the throttle valve 22, and the opening degree of the EGR valve 33, the controller 70 is configured to adjust the excess air ratio (air fuel ratio) (i.e., the controller 70 executes $\lambda$ control) and to adjust the unburned fuel components (hydrocarbons) contained in the exhaust gas such that the temperature of the exhaust gas discharged from the DOC 40 is increased and the DPF 52 is regenerated.

The characteristics of the retardation of the main fuel injection and the oil dilution will now be explained in order to make the illustrated embodiment of the present invention easier to understand. As discussed above, the DPF 52 will eventually become clogged if the DPF 52 continues to capture particulate matter discharged from the engine 10. Therefore, it is necessary to execute the exhaust gas temperature control to raise the exhaust gas temperature when a prescribed amount of particulate matter has accumulated so that the accumulated particulate matter can be burned and removed from the DPF 52.

Figure 2A:
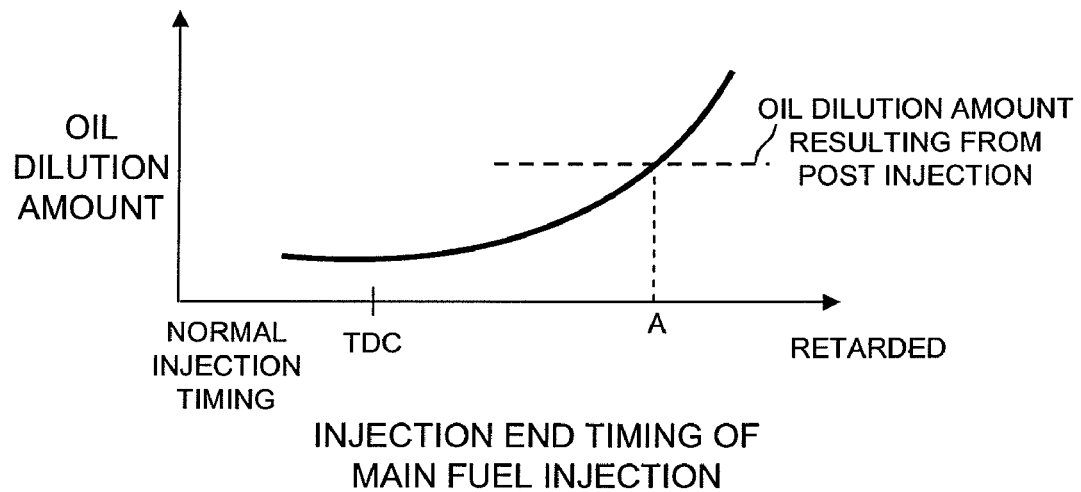
FIG. 2A is a schematic diagram for explaining dilution of the engine oil resulting from retarded combustion in accordance with the illustrated embodiment of the present invention.

One possible way to increase the exhaust gas temperature is to retard the injection timing of the main fuel injection in comparison with the normal injection timing of the main fuel injection. Another possible way to increase the exhaust gas temperature is to execute a supplemental post fuel injection during the power stroke (expansion stroke) after the main fuel injection. As shown in FIG. 2A, if the injection timing of the main fuel injection is retarded such that the injection end timing of the main fuel injection is relatively close to a normal injection end timing of the main fuel injection, then a retarded combustion executed with the main fuel injection (i.e., retardation of the main fuel injection timing) does not cause the engine oil to be as diluted as when a post injection is executed during the power stroke.

In a medium engine load operating region (normal operating region), the temperature of the exhaust gas is higher than when the engine 10 is in a low engine load operating region and the exhaust gas temperature sufficient to burn the accumulated particulate matter can be achieved by retarding the injection end timing of the main fuel injection only slightly in comparison with a normal injection end timing. Therefore, retarding the main fuel injection (retarded combustion) is the preferred method of raising the exhaust gas temperature in the medium engine load operating region, and thus, is given priority over execution of a post injection.

However, when the engine 10 is operating in the low engine load operating region, the required fuel injection amount is smaller than when the engine 10 is operating in the medium engine load operating region. Consequently, in order to raise the exhaust gas temperature to a temperature sufficient to burn the particulate matter accumulated in the DPF 52 under the low engine load operating conditions, it is necessary to retard the injection timing of the main fuel injection greatly in comparison with the retardation amount in the medium engine load conditions. It has been observed that when the fuel injection end timing is retarded in the low engine load operating region by a much greater amount than in the case of the medium engine load conditions, the engine oil becomes even more diluted than when a post injection is executed during the power stroke.

Figure 2B:
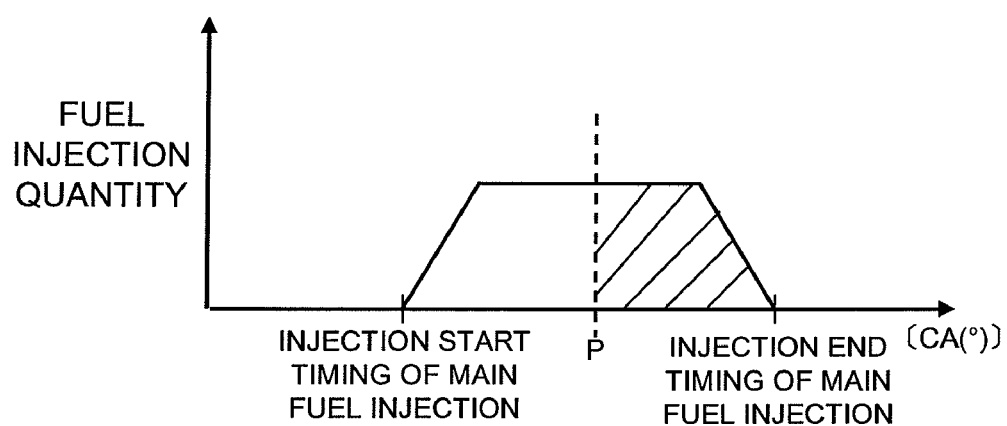
FIG. 2B is a schematic diagram for explaining the fuel injection timing that contributes to oil dilution when the main fuel injection is retarded in accordance with the illustrated embodiment of the present invention.

In other words, when the timing of the main fuel injection is retarded greatly in the low engine load operating region, the fuel that is injected after a prescribed crank angle P (FIG. 2B) dilutes the engine oil more than when a post injection is executed during the power stroke. In other words, the fuel corresponding to the shaded (hatched) section of FIG. 2B dilutes the engine oil. The prescribed crank angle P varies depending on the specification of the engine 10. Therefore, in the exhaust gas temperature control in this illustrated embodiment of the present invention, a crank angle corresponding to the prescribed crank angle P is determined as appropriate according to the specification of the engine 10.

Consequently, as shown in FIG. 2A, as the injection end timing of the retarded main fuel injection becomes more retarded, the amount of oil dilution will increase greatly and the engine oil will be diluted more than when a post injection is executed during the power stroke. More specifically, if the main fuel injection is retarded by or more than a retardation limit amount A shown in FIG. 2A, then the amount of oil dilution resulting from retarding the main fuel injection becomes larger than the amount of oil dilution resulting from the post fuel injection (i.e., the dilution of the engine oil exceeds a prescribed condition).

On the other hand, when the engine speed and the engine load are high (i.e., in the high engine speed/high engine load operating region), the amount of smoke discharged increases because the injection amount of the main fuel injection is larger. The smoke discharge amount can be decreased by advancing or retarding the main fuel injection timing relative to top dead center (TDC), as shown in FIG. 3A. As shown in FIG. 3B, however, retarding the timing of the main fuel injection promotes combustion in the exhaust passage 23 and increases the bed temperature of the DPF 52, which can possibly accelerate the thermal degradation of the DPF 52. Thus, there is a limit to the amount by which the main fuel injection timing can be advanced without causing the bed temperature to become too high. However, when the exhaust gas temperature is raised by executing control to retard the timing of the main fuel injection, the smoke discharge amount cannot be decreased sufficiently if the injection timing is held within a range in which the bed temperature of the DPF 52 does not become too high. If the smoke discharge amount is large, then the amount of discharged particulate matter contained therein will be large and more time will be required to regenerate the DPF 52.

Accordingly, the controller 70 of the illustrated embodiment is configured to execute an exhaust gas temperature control to retard the timing of the main fuel injection (second fuel injection control) when it is determined that the prescribed amount of particulate matter has accumulated in the DPF 52 (i.e., it is time to regenerate the DPF 52) while the engine 10 is operating in a normal operating region (second operating region). If the engine is operating in the low engine load operating region (first operating region), then a post injection control is executed in addition to the main fuel injection timing retardation control (first fuel injection control) because the amount of engine oil dilution will be large if the DPF 52 is regenerated solely by retarding the timing of the main fuel injection. On the other hand, if the engine 10 is operating in the high engine speed/high engine load operating region (third operating region), then, in order to avoid increasing the amount of smoke discharged from the engine 10, the main fuel injection is advanced and the exhaust gas temperature is raised by executing a post injection (third fuel injection control).

The operation of the exhaust gas temperature control apparatus in accordance with the illustrated embodiment will now be explained in detail. FIG. 4 is a flowchart for explaining the main control flow executed by the controller 70 of the exhaust gas temperature control apparatus. When it is time to regenerate the DPF 52, the controller 70 is configured to execute the processing shown in FIG. 4 repeatedly once per prescribed cycle time (e.g., every 10 milliseconds).

In step S1, the controller 70 is configured to estimate the particulate matter accumulation amount Mpm of the DPF 52. More specifically, the controller 70 is configured to estimate the particulate matter accumulation amount Mpm based on the pressure difference detected by the pressure difference sensor 61.

In step S2, the controller 70 is configured to select an operating region map corresponding to the estimated particulate matter accumulation amount Mpm. The operating region map is used to determine the operating region of the engine 10. As shown in FIG. 5, the operating region map preferably includes Region I (low engine load operating region) in which a post injection control is executed in addition to the main fuel injection timing retardation control, Region II (normal operating region) in which a control is executed to retard the timing of the main fuel injection, and Region III (high engine speed/high engine load operating region) in which the main fuel injection is advanced and the exhaust gas temperature is raised by executing a post injection.

Figure 6:
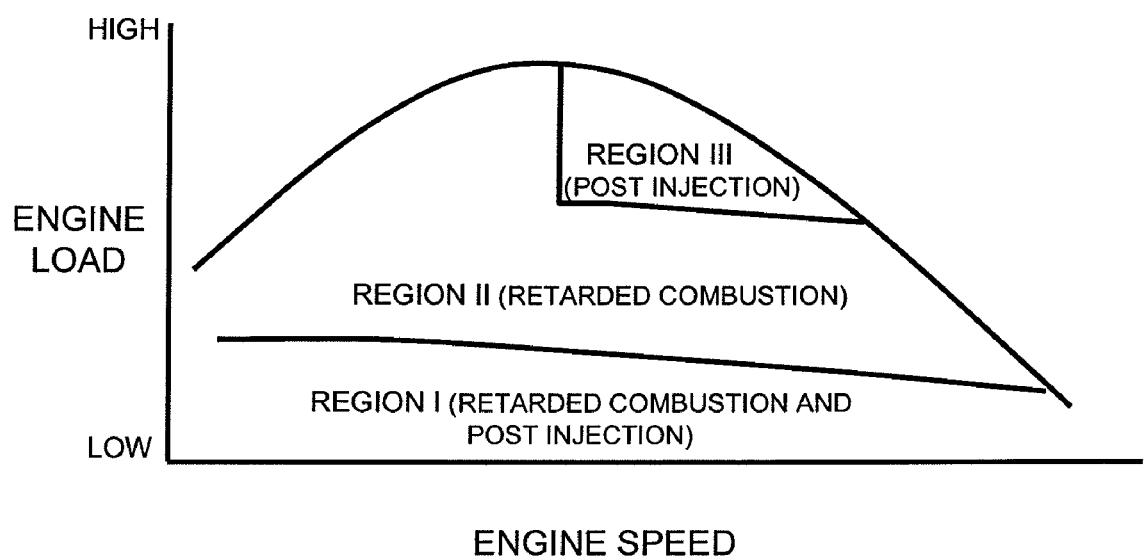
FIG. 6 is a schematic diagram illustrating an example of an operating region map referred by the exhaust gas temperature control apparatus in accordance with the illustrated embodiment of the present invention.

More specifically, as shown in FIG. 5, the operating region map is set such that when the particulate matter accumulation amount Mpm is large (i.e., when the exhaust gas purificatory performance of the DPF 52 has declined), the boundary line between Region I and Region II and the boundary line between Region II and a Region III are moved towards the positions indicated with the dotted lines. This movement of the boundary lines enlarges Region I and Region III and reduces the size of Region II as the particulate matter accumulation amount Mpm becomes large. Alternatively, it is also acceptable to prepare a plurality of operating region maps corresponding to the different particulate matter accumulation amounts Mpm, and to select the most appropriate operating region map according to the particulate matter accumulation amount Mpm, or to set the boundary lines between the operating regions in a continuous manner by applying a linear interpolation to the boundary lines of the plurality of operating region maps based on the particulate matter accumulation amount Mpm. The maps used in step S2 are preferably set in advance experimentally and stored in the ROM of the controller 70. The illustrated embodiment describes an example when an operating region map shown in FIG. 6 is used.

In step S3, the controller 70 is configured to determine the current operating region of the engine 10 based on the engine speed and the engine load using the operating region map (e.g., FIG. 6) selected in step S2.

In step S4, the controller 70 is configured to determine if the engine 10 is currently operating in Region I (low engine load operating region). If the engine 10 is operating in Region I, then the controller 70 proceeds to step S5. Otherwise, the controller 70 proceeds to step S6.

Figure 7:
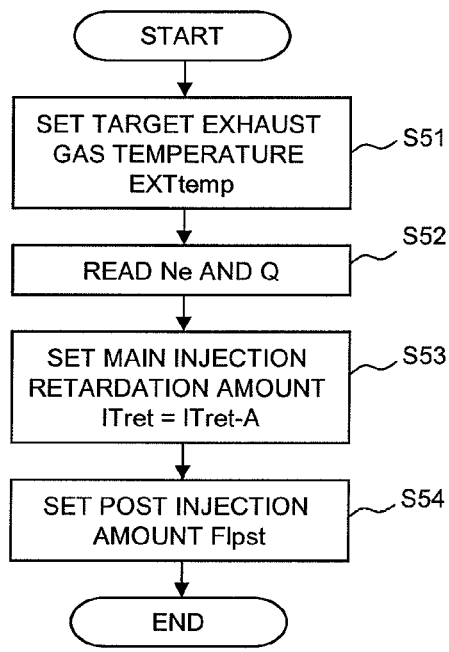
FIG. 7 is a flowchart for explaining a retarded combustion and post injection control executed by the controller of the exhaust gas temperature control apparatus in order to retard the main fuel injection timing and to conduct a post injection when the engine is operating in the low engine load operating region in accordance with the illustrated embodiment of the present invention.

In step S5, the controller 70 is configured to execute a retarded combustion and post injection control processing (first fuel injection control) shown in the flowchart of FIG. 7 to retard the main fuel injection timing and to execute a post injection.

In step S51 of FIG. 7, the controller 70 is configured to set a target exhaust gas temperature EXTtemp. The target exhaust gas temperature EXTtemp is an exhaust gas temperature that is required to treat the particulate matter (i.e., regenerate the DPF 52) and is set based on the particulate matter accumulation amount Mpm of the DPF 52. When the particulate matter accumulation amount Mpm of the DPF 52 is large, the regeneration temperature is high and the heat of combustion of the particulate matter is large. Thus, there is the possibility that the thermal degradation of the DPF 52 will be accelerated. Therefore, when the particulate matter accumulation amount Mpm of the DPF 52 is large, the target exhaust gas temperature EXTtemp is set to a lower temperature. On the other hand, when the particulate matter accumulation amount Mpm of the DPF 52 has decreased, the heat of combustion of the particulate matter is smaller and the target exhaust gas temperature EXTtemp is set to a higher temperature than when the particulate matter accumulation amount Mpm is large in order to regenerate the DPF 52 earlier. In this way, the target exhaust gas temperature EXTtemp is set based on the particulate matter accumulation amount Mpm in the DPF 52 such that thermal degradation of the DPF 52 is suppressed. After the target exhaust gas temperature EXTtemp is set, the controller 70 proceeds to step S52.

In step S52, the controller 70 is configured to detect the current operating state of the engine 10. More specifically, the controller 70 is configured to read the engine speed Ne and the fuel injection quantity Q.

Then, in steps S53 and S54, the controller 70 is configured to set a main injection retardation amount ITret (retardation amount of the main fuel injection timing) and an injection quantity FIpst of the post fuel injection.

More specifically, in step S53, the controller 70 is configured to set the main injection retardation amount ITret to a value ITret-A. The value ITret-A corresponds to the retardation limit amount A shown in FIG. 2A where the amount of oil dilution resulting from retarding the main fuel injection becomes larger than the amount of oil dilution resulting from the post fuel injection (i.e., the dilution of the engine oil exceeds a prescribed condition). Setting the retardation amount ITret of the main fuel injection in this way prevents the retardation amount ITret from becoming too large and causing the amount of oil dilution to increase.

In step S54, the controller 70 is configured to set the injection quantity FIpst of the post fuel injection based on the retardation amount ITret of the main fuel injection timing to provide the additional heat necessary to achieve the target exhaust gas temperature EXTtemp. Since the retardation amount ITret of the main fuel injection timing is limited to ITret-A, the target exhaust gas temperature EXTtemp cannot be reached with the retardation of the main fuel injection alone. The post fuel injection serves to raise the exhaust gas temperature by the amount that could not be achieved with the retardation of the main fuel injection. The post injection quantity FIpst is set, for example, based on the difference between the target exhaust gas temperature EXTtemp and an estimated exhaust gas temperature EXtemp that would be obtained if combustion was conducted merely with the main fuel injection retarded by the retardation amount ITret (i.e., ITret-A). By retarding the main fuel injection timing and executing a post injection in this way, the target exhaust gas temperature EXtemp can be achieved while preventing the engine oil from becoming diluted.

The explanation of the operation will now return to the main flowchart shown in FIG. 4.

In step S6, the controller 70 is configured to determine whether the engine 10 is currently operating in Region II (normal operating region). If the engine 10 is operating in Region II, then the controller 70 proceeds to step S7 and executes the main injection retardation control (second fuel injection control) to retard the timing of the main fuel injection. More specifically, the main injection retardation control in step S7 is executed according similar control processing as steps S51 to S53 of the flowchart shown in FIG. 7. When the engine 10 is operating in Region II, the engine load is higher than when the engine 10 is operating in Region I and the amount of oil dilution will not become large even if only retardation of the main fuel injection timing is executed. Therefore, the post injection control is prohibited and only retardation control is executed in Region II.

On the other hand, if the controller 70 determines that the engine 10 is not operating in Region II in step S6, then the controller 70 determines that the engine is operating in Region III (high engine speed/high engine load operating region) and the controller 70 proceeds to step S8.

In step S8, the controller 70 is configured to execute a post injection control (third fuel injection control). The post injection control executed in step S8 is accomplished by executing the subroutine shown in FIG. 8.

Figure 8:
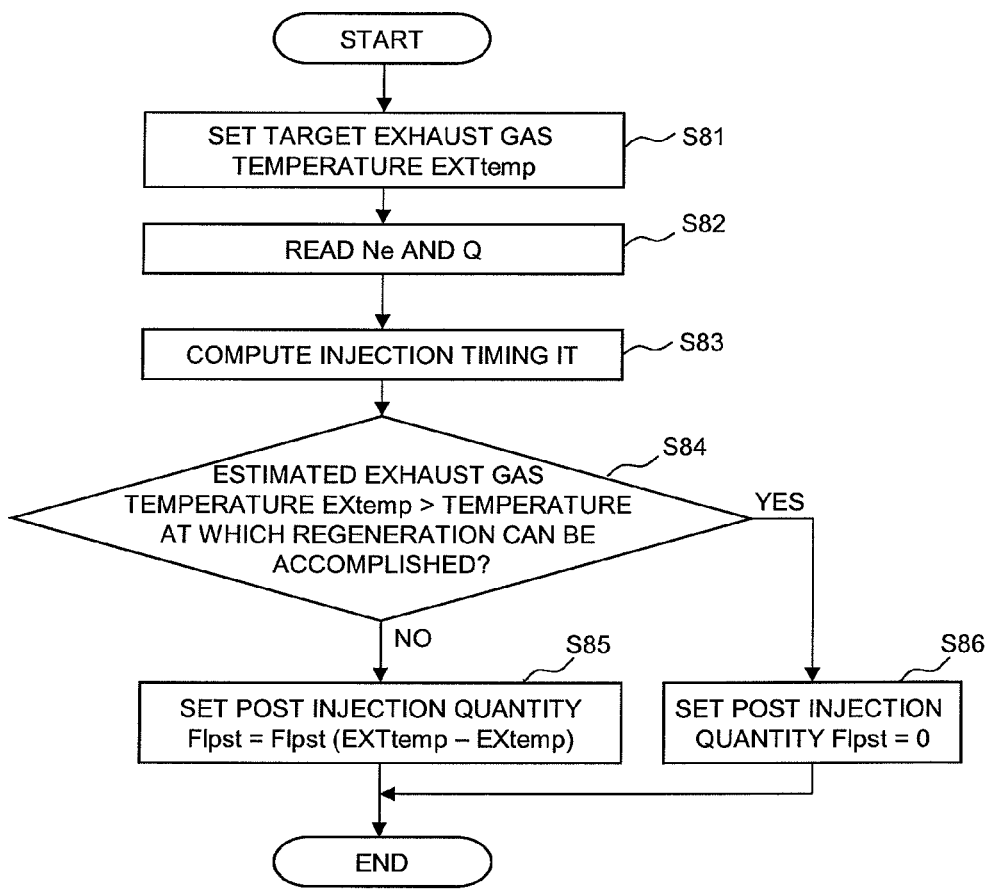
FIG. 8 is a flowchart for explaining a post injection control executed by the controller of the exhaust gas temperature control apparatus in order to set the main fuel injection timing and to conduct a post injection when the engine is operating in the high engine speed/high engine load operating region in accordance with the illustrated embodiment of the present invention.

In step S81 of FIG. 8, the controller 70 is configured to set the target exhaust gas temperature EXTtemp. The target exhaust gas temperature EXTtemp is an exhaust gas temperature that is required to treat the particulate matter (i.e., regenerate the DPF 52) and is set based on the particulate matter accumulation amount Mpm of the DPF 52. When the particulate matter accumulation amount Mpm of the DPF 52 is large, the regeneration temperature is high and the heat of combustion of the particulate matter is large. Thus, there is the possibility that the thermal degradation of the DPF 52 will be accelerated. Therefore, when the particulate matter accumulation amount Mpm of the DPF 52 is large, the target exhaust gas temperature EXTtemp is set to a lower temperature. On the other hand, when the particulate matter accumulation amount Mpm of the DPF 52 has decreased, the heat of combustion of the particulate matter is smaller and the target exhaust gas temperature EXTtemp is set to a higher temperature than when the particulate matter accumulation amount Mpm is large in order to regenerate the DPF 52 earlier. In this way, the target exhaust gas temperature EXTtemp is set based on the particulate matter accumulation amount Mpm in the DPF 52 such that thermal degradation of the DPF 52 is suppressed. After the target exhaust gas temperature EXTtemp is set, the controller 70 proceeds to step S82.

In step S82, the controller 70 is configured to detect the current operating state of the engine 10. More specifically, the controller 70 is configured to read the engine speed Ne and the fuel injection quantity Q.

In step S83, the injection timing IT of the main fuel injection is computed based on the engine speed Ne and the fuel injection quantity Q. When the engine load and engine speed are high, the fuel injection quantity is large. Since the fuel injection quantity is larger than when the engine 10 is in the low engine load operating region, the fuel density inside the cylinder is higher and smoke is produced. Therefore, in the illustrated embodiment of the present invention, the main fuel injection timing IT is set such that the amount of smoke produced is reduced.

In step S84, the controller 70 is configured to estimate the estimated exhaust gas temperature EXtemp based on the engine speed Ne, the fuel injection quantity Q, and the main fuel injection timing IT set in step S83. The controller 70 is then configured to determine if the estimated exhaust gas temperature EXtemp exceeds a temperature at which regeneration of the DPF 52 can be accomplished. Within Region III (high engine speed/high engine load operating region), especially at higher engine speeds and engine loads, the fuel injection quantity Q is large and the heat of combustion is high. Consequently, the particulate matter accumulated in the DPF 52 can be processed without executing any special control for the purpose of regenerating the DPF 52.

In step S84, if the estimated exhaust gas temperature EXtemp is larger than the temperature at which regeneration can be accomplished, then the controller 70 proceeds to step S86.

In step S86, the controller 70 is configured to set the post fuel injection quantity FIpst to 0 before ending the subroutine shown in FIG. 8.

On the other hand, if the estimated exhaust gas temperature EXtemp is not larger than the temperature at which regeneration can be accomplished in step S84, then the controller 70 determines that it will be difficult to regenerate the DPF 52 by merely executing combustion with a main fuel injection timing set for suppressing the production of smoke and proceeds to step S85.

In step S85, the controller 70 is configured to set the post fuel injection quantity FIpst to execute a post fuel injection. The post fuel injection quantity FIpst is set in step S85 based on the target exhaust gas temperature EXTtemp and the estimated exhaust gas temperature EXtemp that would be obtained if only a main injection was executed. By setting the post injection quantity FIpst in this manner, an optimum regeneration temperature can be achieved when the engine 10 is operating in the high engine speed/high engine load operating region.

Accordingly, in the illustrated embodiment, when it is time to regenerate the DPF 52, the controller 70 is configured to execute the exhaust gas temperature control to retard the injection timing of the main fuel injection if the engine 10 is operating in the normal operating region (Region II). If the engine 10 is operating in the low engine load operating region (Region I), then a post injection control is executed in addition to the retardation control of the main fuel injection timing. In this way, the exhaust gas temperature can be increased sufficiently while suppressing dilution of the engine oil. On the other hand, if the engine 10 is operating in the high engine speed/high engine load operating region (Region III), then the controller 70 is configured to switch from retardation of the main fuel injection timing to execution of a post injection, thereby preventing the bed temperature of the DPF 52 from increasing too much and keeping the amount of smoke discharged from the engine 10 low.

The present invention is not limited to the embodiment described heretofore. Numerous variations and modification can be made without departing from the scope of the technical idea of the invention. For example, although the illustrated embodiment is directed to a case in which the exhaust gas temperature control in accordance with the invention is employed to regenerate the DPF 52, the invention can also be used to remove sulfur contamination from the NOx trapping catalytic converter provided with the engine.

Accordingly, with the illustrated embodiment of the present invention, when the engine 10 is operating in the low engine load operating region (first operating region), both retardation of the timing of the main fuel injection and a supplemental post fuel injection occurring after the main fuel injection are executed in order to raise the temperature of the exhaust gas (first fuel injection control). On the other hand, when the engine 10 is operating in the normal operating region (second operating region that has higher engine loads than the first operating region), the timing of the main fuel injection is retarded in order to raise the exhaust gas temperature but the execution of a supplemental post fuel injection after the main fuel injection is prohibited (second fuel injection control). As a result, the performance of the DPF 52 can be restored while preventing the engine oil from becoming diluted.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiment has been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method of controlling an exhaust gas temperature of an internal combustion engine having an exhaust gas purification device for purifying an exhaust gas, the method comprising:

determining whether a purificatory performance of the exhaust gas purification device has declined;

determining whether the internal combustion engine is operating in one of a first operating region and a second operating region that has higher engine loads than the first operating region; and executing an exhaust gas temperature control to raise an exhaust gas temperature upon determining that the purificatory performance of the exhaust gas purification device has declined, the executing of the exhaust gas temperature control including performing a first fuel injection control in which a timing of a main fuel injection is retarded and a post fuel injection is executed after the main fuel injection when the internal combustion engine is operating in the first operating region, and performing a second fuel injection control in which the timing of the main fuel injection is retarded and an execution of the post fuel injection after the main fuel injection is prohibited when the internal combustion engine is operating in the second operating region, with the performing of the first fuel injection control including setting a retardation amount of the timing of the main fuel injection to a prescribed retardation amount and setting a fuel quantity of the post fuel injection based on the retardation amount of the main fuel injection.

2. The method as recited in claim 1, wherein
the setting of the retardation amount includes setting the prescribed retardation amount based on a dilution amount of an engine oil as a result of retarding the main injection timing.

3. The method as recited in claim 2, wherein
the setting of the prescribed retardation amount includes setting the prescribed retardation amount to a retardation limit amount at which the dilution amount of the engine oil exceeds a prescribed condition.

4. The method as recited in claim 1, wherein
the detecting of the purificatory performance is performed on the exhaust gas purification device which includes a diesel particulate filter configured and arranged to capture exhaust gas particles contained in the exhaust gas from a diesel engine.

5. The method as recited in claim 1, wherein
the detecting of the purificatory performance is performed on the exhaust gas purification device which includes a NOx trapping catalytic converter that traps nitrogen oxides introduced thereto when an air fuel ratio of the exhaust gas is lean and that releases trapped nitrogen oxides when the air fuel ratio of the exhaust gas is rich.

6. A method of controlling an exhaust gas temperature of an internal combustion engine having an exhaust gas purification device for purifying an exhaust gas, the method comprising:
determining whether a purificatory performance of the exhaust gas purification device has declined;
determining whether the internal combustion engine is operating in one of a first operating region and a second operating region that has higher engine loads than the first operating region;
executing an exhaust gas temperature control to raise an exhaust gas temperature upon determining that the purificatory performance of the exhaust gas purification device has declined, the executing of the exhaust gas temperature control including
performing a first fuel injection control in which a timing of a main fuel injection is retarded and a post fuel injection is executed after the main fuel injection when the internal combustion engine is operating in the first operating region, and
performing a second fuel injection control in which the timing of the main fuel injection is retarded and an execution of the post fuel injection after the main fuel injection is prohibited when the internal combustion engine is operating in the second operating region; and
determining whether the internal combustion engine is operating in a third operating region that has higher engine loads than the second operating region,
the executing of the exhaust gas temperature control further including performing a third fuel injection control in which a retardation of the timing of the main fuel injection is prohibited and the post fuel injection is selectively executed after the main fuel injection when the internal combustion engine is operating in the third operating region.

7. An internal combustion engine system comprising:
an exhaust gas purification device configured to be arranged in an exhaust passage of an internal combustion engine to clean an exhaust gas discharged from the internal combustion engine;
an injector configured and arranged to selectively supply fuel to the internal combustion engine; and
a controller configured to determine if the purificatory performance of the exhaust gas purification device has declined, and to determine if the internal combustion engine is operating in one of a first operating region and a second operating region that is higher engine loads than the first operating region,
the controller being further configured to execute an exhaust gas temperature control to raise an exhaust gas temperature by controlling the injector when the controller determines that the purificatory performance of the exhaust gas purification device has declined so that
a first fuel injection control is performed in which a timing of a main fuel injection is retarded and a post fuel injection is executed after the main fuel injection when the internal combustion engine is operating in the first operating region, and
a second fuel injection control is performed in which the timing of the main fuel injection is retarded and an execution of the post fuel injection after the main fuel injection is prohibited when the internal combustion engine is operating in the second operating region,
with the controller being further configured to set a retardation amount of the timing of the main fuel injection to a prescribed retardation amount, and to set a fuel quantity of the post fuel injection based on the retardation amount of the main fuel injection during the first fuel injection control.

8. The internal combustion engine system as recited in claim 7, wherein
the controller is further configured to set the prescribed retardation amount based on a dilution amount of an engine oil as a result of retarding the main injection timing.

9. The internal combustion engine system as recited in claim 8, wherein
the controller is further configured to set the prescribed retardation amount to a retardation limit amount at which the dilution amount of the engine oil exceeds a prescribed condition.

10. The internal combustion engine system as recited in claim 7, wherein
the exhaust gas purification device includes a diesel particulate filter configured and arranged to capture the exhaust gas particles contained in exhaust gas from a diesel engine.

11. The internal combustion engine system as recited in claim 7, wherein
the exhaust gas purification device includes a NOx trapping catalytic converter that traps nitrogen oxides introduced thereto when an air fuel ratio of the exhaust gas is lean and that releases trapped nitrogen oxides when the air fuel ratio of the exhaust gas is rich.

12. An internal combustion engine system comprising:
an exhaust gas purification device configured to be arranged in an exhaust passage of an internal combustion engine to clean an exhaust gas discharged from the internal combustion engine;

an injector configured and arranged to selectively supply fuel to the internal combustion engine; and a controller configured to determine if the purificatory performance of the exhaust gas purification device has declined, and to determine if the internal combustion engine is operating in one of a first operating region and a second operating region that is higher engine loads than the first operating region, the controller being further configured to execute an exhaust gas temperature control to raise an exhaust gas temperature by controlling the injector when the controller determines that the purificatory performance of the exhaust gas purification device has declined so that a first fuel injection control is performed in which a timing of a main fuel injection is retarded and a post fuel injection is executed after the main fuel injection when the internal combustion engine is operating in the first operating region, and a second fuel injection control is performed in which the timing of the main fuel injection is retarded and an execution of the post fuel injection after the main fuel injection is prohibited when the internal combustion engine is operating in the second operating region, the controller being further configured to determine whether the internal combustion engine is operating in a third operating region that has higher engine loads than the second operating region, and to execute the exhaust gas temperature control so that a third fuel injection control is performed in which a retardation of the timing of the main fuel injection is prohibited and the post fuel injection is selectively executed after the main fuel injection when the internal combustion engine is operating in the third operating region.

13. An exhaust gas temperature control apparatus comprising:

purificatory performance determining means for determining whether a purificatory performance of an exhaust gas purification device of an internal combustion engine has declined;

operation region determining means for determining whether the internal combustion engine is operating in one of a first operating region and a second operating region that has higher engine loads than the first operating region; and exhaust gas temperature controlling means for raising an exhaust gas temperature upon determining that the purificatory performance of the exhaust gas purification device has declined, the exhaust gas temperature control executing means including functions for performing a first fuel injection control in which a timing of a main fuel injection is retarded and a post fuel injection is executed after the main fuel injection when the internal combustion engine is operating in the first operating region, and performing a second fuel injection control in which the timing of the main fuel injection is retarded and an execution of the post fuel injection after the main fuel injection is prohibited when the internal combustion engine is operating in the second operating region, with the exhaust gas temperature controlling means being further configured to set a retardation amount of the timing of the main fuel injection to a prescribed retardation amount, and to set a fuel quantity of the post fuel injection based on the retardation amount of the main fuel injection during the first fuel injection control.

* * * * *